(12) United States Patent
Gardner

(10) Patent No.: US 7,148,497 B2
(45) Date of Patent: Dec. 12, 2006

(54) VARIABLE WAVELENGTH ULTRAVIOLET LAMP

(76) Inventor: William G. Gardner, 4608 W. Bluefield Ave., Glendale, AZ (US) 85308

(*) Notice: Subject to any disclaimer, the term of this patent is extended or adjusted under 35 U.S.C. 154(b) by 11 days.

(21) Appl. No.: 10/742,704

(22) Filed: Dec. 19, 2003

(65) Prior Publication Data

US 2005/0133740 A1    Jun. 23, 2005

(51) Int. Cl.
*G01J 1/00*     (2006.01)
*G21F 5/02*     (2006.01)
*H01J 1/62*     (2006.01)

(52) U.S. Cl. .............. 250/503.1; 250/504 R; 250/498.1; 313/485; 313/486

(58) Field of Classification Search ............ 250/504 R, 250/505.1, 454.1, 455.1, 493.1, 494, 494.1, 250/365, 503.1, 498.1; 355/113; 313/485–487
See application file for complete search history.

(56) References Cited

U.S. PATENT DOCUMENTS

| | | | |
|---|---|---|---|
| 1,888,421 A | 11/1932 | Beck | |
| 2,135,732 A | 11/1938 | Randall et al. | |
| 2,622,221 A | 12/1952 | Beese | |
| 3,444,415 A | 5/1969 | Skirvin | |
| 3,676,728 A | 7/1972 | Schreurs | |
| 4,243,900 A | 1/1981 | Brecher et al. | |
| 4,703,224 A | 10/1987 | Rattray et al. | |
| 4,967,090 A | 10/1990 | Schlitt | |
| 5,175,437 A * | 12/1992 | Waluszko | 250/504 R |
| 5,387,801 A | 2/1995 | Gonzalez et al. | |
| 5,557,112 A | 9/1996 | Csoknyai et al. | |
| 5,736,744 A | 4/1998 | Johannsen et al. | |
| 5,737,065 A * | 4/1998 | Hansen | 355/113 |
| 5,998,789 A * | 12/1999 | Kovalsky et al. | 250/302 |
| 6,512,236 B1 * | 1/2003 | Seville | 250/458.1 |
| 6,670,619 B1 * | 12/2003 | Waluszko | 250/492.1 |
| 6,717,164 B1 * | 4/2004 | Ullrich et al. | 250/504 R |

* cited by examiner

Primary Examiner—David A. Vanore
(74) Attorney, Agent, or Firm—Matthew P. Schmehl

(57) ABSTRACT

A variable wavelength ultraviolet lamp. An apparatus for selectively producing one or more of a plurality of wavelength distributions of light is provided, comprising a primary light source having a primary wavelength distribution, at least one wavelength-transforming material that, in response to illumination by the primary light source produces secondary light having a wavelength distribution different from the primary light wavelength distribution, the wavelength-transforming material being disposed on a substrate external to the primary light source, and a wavelength-transforming material selection mechanism for placing at least a portion of one or more selected wavelength-transforming materials in front of the primary light source, in a selected preferred direction of light emission from the apparatus, such that the selected wavelength-transforming materials emit from the apparatus light having a wavelength distribution different from the primary light wavelength distribution.

3 Claims, 7 Drawing Sheets

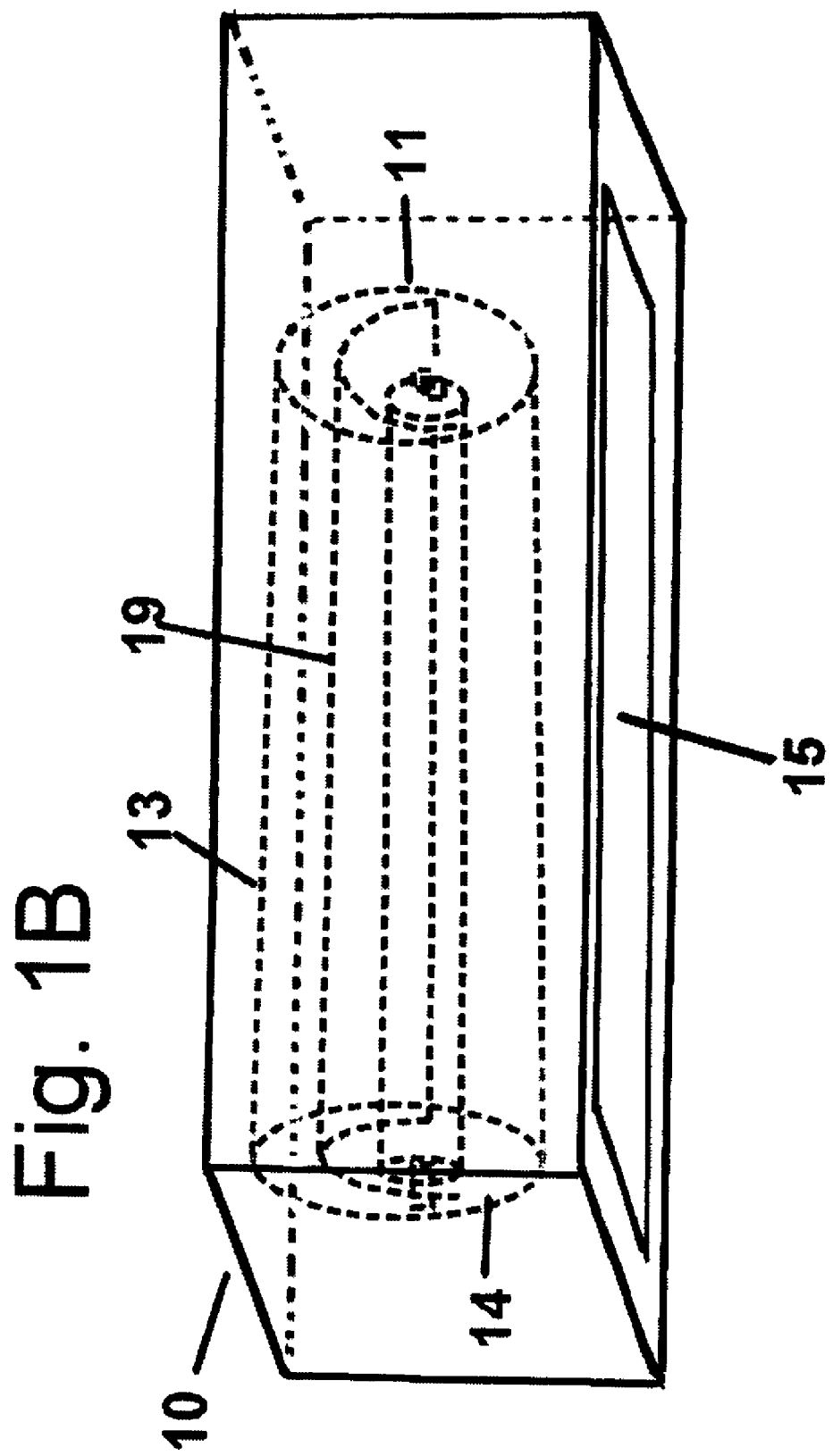

VARIABLE WAVELENGTH ULTRAVIOLET LAMP

BACKGROUND

The field of the present invention is ultraviolet light-emitting "blacklight" lamps used in mineralogy, scientific research, and related fields.

Ultraviolet lamps are widely used by geologists, rockhounds, and collectors of minerals both for identification of mineral materials and for creating the spectacular displays of fluorescence that many minerals emit when illuminated with ultraviolet light. Some minerals, which may appear drab or colorless when viewed under normal visible light, upon irradiation with ultraviolet light emit bright colored visible light that is characteristic both of the mineral in question and of the wavelength of the ultraviolet light used in the illumination. For instance, one variety of the mineral calcite found in Mexico, normally of a whitish color, will fluoresce a bright blue-white color when illuminated with short-wave ultraviolet light, a yellow color when illuminated by longer wave lengths of ultraviolet light, and a bright pink color when illuminated with yet longer wave lengths of ultraviolet light.

Geologists, collectors and other devotees of mineralogy often use and greatly enjoy the spectacular visual displays produced by fluorescent minerals, using ultraviolet lamps of various types to produce this fluorescence. The ability to employ the various wavelengths of ultraviolet light, and view the resulting different effects on minerals, greatly adds to mineralogical knowledge and to the enjoyment of this field of study by professionals and amateurs alike.

Other fields of science also employ ultraviolet lamps for several purposes; for instance in the fields of molecular biology and biochemistry, ultraviolet light of various wavelengths is used to illuminate, on a transilluminator, electrophoresis gels which are used in the analysis of DNA and proteins. Ultraviolet lamps are also used in other applications such as forensics, where an ability to change readily between different ultraviolet and visible wavelengths of illumination, in a durable, less expensive apparatus, would also be desirable.

The ultraviolet light portion of the electromagnetic spectrum is normally divided into at least three portions, characterized by the wavelength of the light in question. Ultraviolet light is generally viewed as light having wavelengths less than about 400 nanometers (nm=$10^{-9}$ m), which is about the shortest wavelength of light that the human eye can perceive as violet in color, and greater than about 200 nm. The limit of the ultraviolet portion of the electromagnetic spectrum at the short wavelength end is not absolutely fixed, but as ultraviolet light of wavelengths much shorter than 200 nm is strongly absorbed by the gases in air, light of wavelengths below 200 nm (usually called "far" or "vacuum" ultraviolet) is not typically used in applications contemplated for the present invention, especially as use of even shorter wavelengths of ultraviolet light acts to produce the toxic gas ozone from oxygen in air. Thus, as a practical matter, 200 nm is conveniently chosen as the short wavelength limit.

Within this range ultraviolet light is roughly divided into three sections: UV C or "short-wave" UV being of the shortest wavelengths from approximately 200 nm up to about 280 nm, UV B or "medium-wave UV" being of intermediate wavelengths from about 280 nm to about 320 nm, and UV A, or "long-wave" UV being of the longest wavelengths from about 320 nm up to 400 nm, where the visible light portion of the electromagnetic spectrum begins. These divisions are general in nature, with the dividing lines being somewhat indefinite. UV light sources of differing wavelengths have different effects, one of which is the color of visible light produced when some fluorescent materials or minerals are illuminated by various kinds of the UV light sources.

Ultraviolet light can be generated by a number of methods, but one of the commonest sources of ultraviolet light is the low pressure mercury vapor discharge lamp. In this type of lamp, electrical current passes through an essentially evacuated quartz or glass tube which contains small quantities of vaporized mercury metal plus small amounts of an inert "starter" gas. The effect of this electric current is to electronically excite the mercury atoms in such as way as to cause the emission of ultraviolet light of wavelengths characteristic for mercury vapor at low pressure, most notably ultraviolet light of wavelength 254 nm in the UV C wavelength band. U.S. Pat. No. 1,888,421 describes an apparatus of this type where mercury is added to evacuated electrical discharge tubes containing small amounts of various types of inert gases in order to produce the blue colored ultraviolet light emissions characteristic of mercury. This enables production of the characteristic emission wavelengths of low pressure mercury vapor in the UV C region of the ultraviolet light spectrum, but low pressure mercury vapor does not emit much ultraviolet light in the UV A or UV B wavelength bands.

Ultraviolet light in the UV A and UV B ranges is commonly produced through the use of phosphors, substances that emit light in the appropriate wavelength range of the ultraviolet spectrum when illuminated by UV light of shorter wavelengths. U.S. Pat. No. 2,135,732 discloses the use of luminescent (phosphorescent or fluorescent) materials coated on the inside of a mercury vapor discharge tube to produce light, of a different wavelength from that of the primary low pressure mercury vapor UV light emission. It should be noted that there are two terms employed in describing the emission of light from a material when it is illuminated by light of a different wavelength: fluorescence and phosphorescence. While both phenomena arise from very similar physical processes, they differ in the length of time that the light emission persists after the illuminating light is turned off, phosphorescence persisting longer than fluorescence. However, in the present context the terms may be considered to be interchangeable. Thus the terms phosphor and fluor have the same meaning in the present context, that is materials which emit light of a different wavelength or set of wavelengths from that with which they are illuminated to stimulate the emission.

Typically, ultraviolet light in the UV A and UV B spectral ranges is produced by coating the inside of the glass envelope of a UV C emitting lamp, usually of the low pressure mercury vapor discharge type, with various types of phosphors. When the electric current is passed through the low pressure mercury vapor, it emits its characteristic short-wave UV C light. This short-wave UV light illuminates the phosphor lining the inside wall of the glass envelope and causes it to emit light at its characteristic wavelength, UV A or UV B or even visible light, depending upon the identity of the phosphor. Thus, lamps of this type have only been able to produce a single type of ultraviolet illumination: UV C if there is no phosphor, or UV A or UV B or visible light if the glass envelope of the lamp is coated with a phosphor that characteristically emits light in one of these wavelength bands.

To build a lamp designed to selectably emit light in more than one band of UV light, a separate bulb has been used for each of the bands, UV A, UV B, or UV C. U.S. Pat. No. 5,387,801 provides an example. For UV C a low pressure mercury discharge bulb is used, and for UV B or UV A a low pressure mercury vapor discharge bulb lined with an appropriate type of phosphor is used. However, the need to use a different UV bulb for each wavelength band is both expensive and cumbersome, and requires turning each bulb on and off more frequently, which is well known to shorten bulb life.

There have been disclosures of lamps which have phosphors of more than one type within a single bulb; these bulbs have the advantage of being capable of producing light of more than a single wavelength band, yet in these lamps there has been no provision for selecting between one wavelength band and another at will. For instance U.S. Pat. No. 4,703,224 discloses coating the inside of a mercury vapor discharge tube with a mixture of two or more types of phosphors, some emitting UV A and some emitting UV B, in adjustable proportion set at the time of manufacture of the given bulb. While this allows the production of light in more than a single wavelength band of ultraviolet light, it fails to allow for selecting among different wavelength bands during the operation of the lamp.

Likewise U.S. Pat. No. 4,967,090 ("'090 patent") and U.S. Pat. No. 5,557,112 ("'112 patent") disclose coating the inside of mercury vapor discharge tubes with two or more different types of phosphor, each in a specific zone or sector on the inside of the cylindrical bulb. In the '090 patent, the two phosphor types are coated in different longitudinally-disposed areas, while in the '112 patent, one phosphor coats an area at one end of the interior of the cylindrical bulb and the other phosphor coats the rest of the interior of the bulb. These techniques allow production of more than a single wavelength band of light at a given time, but these devices are designed to give a fixed proportion of light in each of the different wavelength bands, to be set at the time of manufacture of the bulb, for the purposes of giving an optimal mixture of wavelength bands to facilitate effective suntanning.

U.S. Pat. No. 3,676,728 discloses a lamp capable of producing selectable illumination with one of a plurality of wavelength bands by using a plurality of types of phosphor coated on the interior of a mercury vapor discharge bulb, in which longitudinal stripes each consisting of one of two or more different phosphors are used. The desired wavelength band is selected by physical rotation of the bulb itself such that the phosphor emitting the desired wavelength is presented at the light exit port of the apparatus. However, this type of bulb suffers from the disadvantages of damage to phosphors and resulting relatively short phosphor lifetimes common to many phosphors that are exposed to the harsh conditions on the inside of a low pressure mercury vapor discharge bulb. This lamp also suffers from the further disadvantage that only a limited fraction of the total light energy emitted by the luminous mercury vapor within the bulb actually falls upon the phosphor selected. As the phosphors are situated within the bulb, it is unavoidable that much of the light energy will be wasted because there is no way to direct it toward the desired phosphor in exclusion of phosphors placed at other locations within the bulb.

It is Well known that phosphors coated on the interior wall of a mercury vapor discharge bulb suffer from exposure to the electric current, mercury atoms and ions, and short-wave ultraviolet light particularly of wavelengths less than 200 nm, for instance the 185 nm far UV emission of mercury vapor that can propagate within a vacuum but is normally stopped by most solid materials of UV bulb construction, and by air. U.S. Pat. No. 4,243,090 describes the loss of efficiency and drop in effective light production by phosphors due to these effects, and discloses an attempt to improve phosphor life within mercury vapor discharge bulbs through chemical treatment of the phosphors.

There have been attempts to reduce this type of damage and provide for longer phosphor life and corresponding reduced cost by placement of the phosphor outside the primary light source bulb. U.S. Pat. No. 5,736,744 discloses an apparatus for use as a transilluminator, a device for visualizing DNA bands in an electrophoresis gel, whereby light emitted from a primary ultraviolet light source may be converted to another wavelength band of UV or visible light by means of a phosphor external to the mercury vapor discharge bulb. An apparatus emitting light in the UV C range on which electrophoresis gels to be illuminated are placed is modified to emit other wavelengths of UV or visible light by placing a transparent plate coated with a phosphor over the light exit port of the apparatus. The phosphor emits light of a different wavelength range, such that the electrophoresis gels are illuminated by the newly-produced wavelength band of light, ultraviolet or visible. However, the system is cumbersome to use in that to shift from the wavelength band of the primary light source to light of a secondary wavelength band, a separate plate must be manually placed over the light exit port of the apparatus. The apparatus incorporates no easy or trouble-free way to shift between different emitted light wavelength bands other than by placing the phosphor-coated plate into a slot, or by swinging it into place via a hinge or pivot point mechanism. No provision is made for using more than a single phosphor-coated plate other than by manually removing one plate from a positioning slot and placing another in its place. Such a device would not be very useful when portability is important as is often the case, for instance, when one wishes to view mineral specimens in the field or do forensic studies at a crime scene. Such a device would also not be useful in applications where a user wished to use a non-manual method, such as an electric motor, to switch between various wavelength-transforming materials (phosphors).

Accordingly, there is a need for a simpler, less costly and more effective apparatus for producing various wavelengths of light, particularly ultraviolet light, from a primary light source.

SUMMARY OF THE INVENTION

In view of the foregoing background, an apparatus for selectively producing one or more of a plurality of wavelength distributions of light is provided, comprising a primary light source having a primary wavelength distribution, at least one wavelength-transforming material that, in response to illumination by the primary light source produces secondary light having a wavelength distribution different from the primary light wavelength distribution, the wavelength-transforming material being disposed on a substrate external to the primary light source, and a wavelength-transforming material selection mechanism for placing at least a portion of one or more selected wavelength-transforming materials in front of the primary light source, in a selected preferred direction of light emission from the apparatus, such that the selected wavelength-transforming materials emit from the apparatus light having a wavelength distribution different from the primary light wavelength distribution.

In one preferred embodiment, the wavelength-transforming material selection mechanism comprises a rotatable cylinder surrounding the primary light source, one or more wavelength-transforming materials being disposed on a surface of the cylinder such that at least one wavelength-transforming material may be placed in front of the primary light source in a preferred direction of light emission from the apparatus by movement of the cylinder.

In another preferred embodiment, the wavelength-transforming material selection mechanism comprises a substantially flat surface comprising one or more wavelength-transforming materials disposed thereon such that one or more wavelength-transforming materials can be placed in front of the primary light source and in a preferred direction of light emission from the apparatus by movement of the substantially flat surface.

In a further preferred embodiment, the wavelength-transforming material selection mechanism comprises a flexible sheet of material having one or more wavelength-transforming materials disposed thereon, the sheet being movably disposed in front of the primary light source and in a preferred direction of light emission from the apparatus so as to select one or more wavelength-transforming materials.

These and other features and advantages of the invention will be more fully understood upon consideration of the following detailed description, taken in conjunction with the following drawings.

BRIEF DESCRIPTION OF THE DRAWINGS

FIG. 1B is a perspective view of the embodiment of FIG. 1A disposed within an enclosure according to the present invention.

DETAILED DESCRIPTION

Figure 1A:
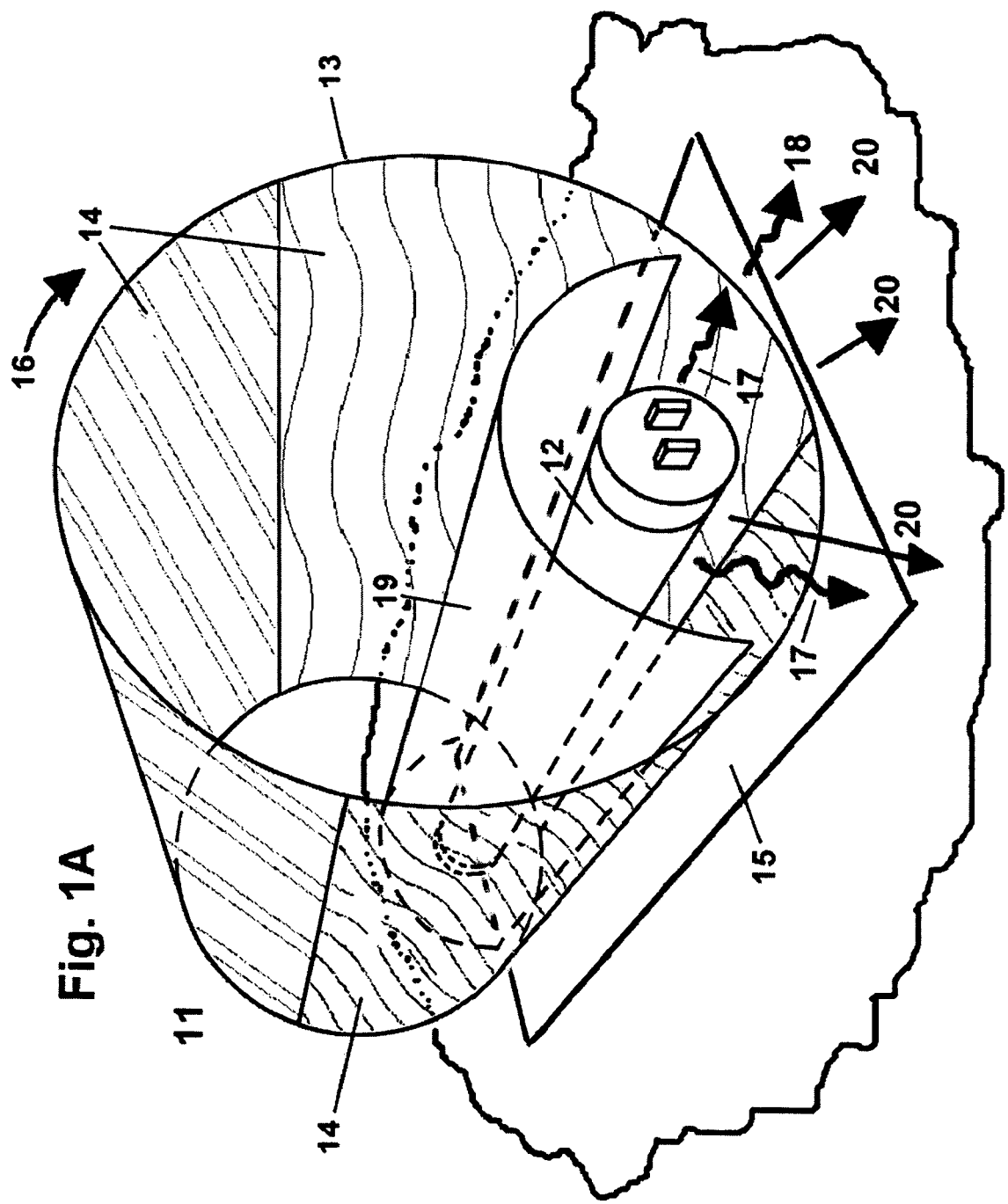
FIG. 1A is a perspective view of a first preferred embodiment of a variable wavelength ultraviolet lamp according to the present invention, wherein a cylindrical substrate is employed for supporting one or more phosphors and selection of a phosphor is made via by rotational movement.

As is shown in FIGS. 1–6, various embodiments 11, 21, 31, 41 and 51 of the present invention comprise a source of primary light which may itself comprise one or more light bulbs or light-emitting members such as lasers or light-emitting diodes (LEDs), a substrate upon which one or more wavelength-transforming materials or phosphors are disposed, and a means for directing the light emitted in a preferred direction. Light from the source of primary light illuminates one or more wavelength-transforming materials disposed on the substrate, which emit different wavelengths of light in response thereto so as to transform some of the energy of the incident light from the source of primary light to a different set of wavelengths of light. Preferably, a reflector unit is incorporated in order to direct light from the primary light source toward the selected wavelength-transforming material and to shade the unselected wavelength-transforming materials, increasing the intensity of light emitted from the apparatus and increasing the efficiency of the apparatus. Preferably walls or baffles of a container serve to direct light in a preferred direction toward the object to be illuminated.

Wavelength-transformed light is emitted from the wavelength-transforming materials situated adjacent to the source of primary light. The wavelength-transforming materials employed in the preferred embodiments described herein are phosphors; however, other wavelength-transforming light-emitting materials may be used without departing from the principles of the invention.

A wavelength-transforming material selection mechanism is provided to select which, if any, wavelength-transforming material, or set of wavelength-transforming materials, is placed adjacent to the light source such that wavelength-transformed light is emitted in the preferred direction. The selection of the wavelength-transforming material may be made in various ways, including rotational movement 16 of a cylindrical substrate (FIG. 1A), sliding movement 36 of a substantially flat substrate (FIG. 3), planar rotational movement 46 of a disc-shaped substantially flat substrate (FIG. 4), or movement 58 of a flexible sheet coated with wavelength-transforming material over the source of primary light, such as by means of rollers 59 (FIG. 5B). Any of these embodiments may be used to illuminate the interior of a display cabinet for fluorescent minerals or other objects (FIG. 6).

The light emitted from the source of primary light, for instance UV C light emitted by a low pressure mercury vapor discharge bulb, falls upon one or more of the plurality of wavelength-transforming materials. Wavelength-transformed light is only emitted from the apparatus by wavelength-transforming materials that lie adjacent to the source of primary light and in the preferred direction of light emission, particularly when a preferred reflector unit 19 is present to direct close to the full light output of the source of primary light upon the selected wavelength-transforming materials. The preferred presence of a reflector unit 19 is of assistance in directing more of the light from the source of primary light onto the selected wavelength-transforming material and shading the unselected wavelength-transforming materials. The selection mechanism enables one or more wavelength bands of light different from the wavelength of the primary light source to be chosen for emission. In that regard, it is to be understood that a portion of the substrate may actually be removed, or at least not coated with a wavelength-transforming material, so that one of the wavelength bands that can be chosen for emission is the wavelength band emitted by the source of primary light itself. It is also to be understood that two different portions of the substrate may be placed partially adjacent to the source of primary light and in the preferred direction of light emission, such that more that one set of wavelengths may be selected for simultaneous emission. It is to be recognized that no real light source actually emits a pure single wavelength, that the primary source as well as the wavelength-transforming materials all emit some band or set of wavelengths of light and that the references to wavelength herein refer to bands of wavelengths having some distribution of spectral density.

Turning now specifically to FIG. 1A, the first preferred embodiment 11 uses as a primary light source 12 a low pressure mercury vapor discharge lamp, which emits UV C light 17 largely at about 254 nanometers (nm) wavelength and which is powered by an electrical supply. Such mercury vapor discharge lamps are widely available in a variety of sizes and configurations, and are known to provide reliable and effective operation. In the embodiment of FIG. 1A the primary light source 12 is surrounded by a cylindrical substrate 13 on which are disposed a plurality of wavelength-transforming materials 14. The cylindrical substrate 13 may be rotated about its axis, as shown by arrow 16, around the primary light source 12 in such a manner as to place one or more of the wavelength-transforming materials 14 in front of the primary light source 12 in a preferred direction of light emission 20 such that light of a different distribution of wavelengths 18 may be emitted from the apparatus. Alternatively no wavelength-transforming material 14 may be located in the preferred direction of light emission 20, in which case primary light 17 is emitted from the apparatus. A defined exit port 15 for the light may be provided, so that the selected wavelength-transforming materials are disposed between the primary light source 12 and the exit port 15. It is understood that the term "cylinder" includes not only a right circular cylinder as pictured, but also includes other tubular or partially-enclosed forms having, for example, hexagonal, pentagonal or square cross-sections.

By means of this rotational movement, one or more wavelength bands of light to be emitted may be selected by the user. Preferably, the plurality of wavelength-transforming materials 14 comprise phosphors of various types having the desired light-emission properties in response to UV C light illumination. The phosphors may be coated on the inner or on the outer surface of the cylindrical substrate 13, which is external to the envelope of the primary light source 12, or may be disposed on separate substrates which are, in turn, attached to a cylindrical support structure. There may be a space or gap between the primary light source 12 and the cylindrical substrate 13, or cylindrical substrate 13 may be in contact with primary light source 12. Indeed the cylindrical substrate 13 may be contiguous with the outer surface of the primary light source 12 when such source is itself cylindrical, and rotation of cylindrical substrate 13 may also result in rotation of a cylindrical bulb primary light source 12; that is, the wavelength-transforming materials may actually be coated on the outside of the cylindrical bulb and the rotational movement includes rotation of the bulb itself.

A portion of the cylindrical substrate may be made transparent to the UV C light so as to allow passage of UV C light 17 from the primary light source 12 in the preferred direction of light emission 20, or a void or slit may be formed in the substrate 13 to allow direct passage of unfiltered and untransformed light 17 in the preferred direction of light emission 20. Also, the cylindrical unit may be rotated such that two adjacent wavelength-transforming materials are both illuminated by the primary light source and both emit their characteristic wavelength bands 18 from the apparatus when the user wishes to view an object under illumination by multiple wavelength bands of light. Preferably a reflector unit 19 is placed on the side of the primary light source 12 opposite from the preferred direction of light emission, disposed within the cylindrical form 13, to direct light in the preferred direction of light emission 20. Although a semi-cylindrical reflector that is semi-circular in cross-section is shown, it is understood that the shape of the reflector may also be flat, parabolic, hyperbolic, angular, or other shapes in cross section, without departing from the principles of the invention.

FIG. 1B shows how assembly 11 may be contained within an enclosure or box 10 suitable for carrying and securing the apparatus. Exit port 15 is formed in the wall of the enclosure. Cylindrical form 13, wavelength-transforming materials 14, and preferably a reflector unit 19 are shown.

Figure 2:
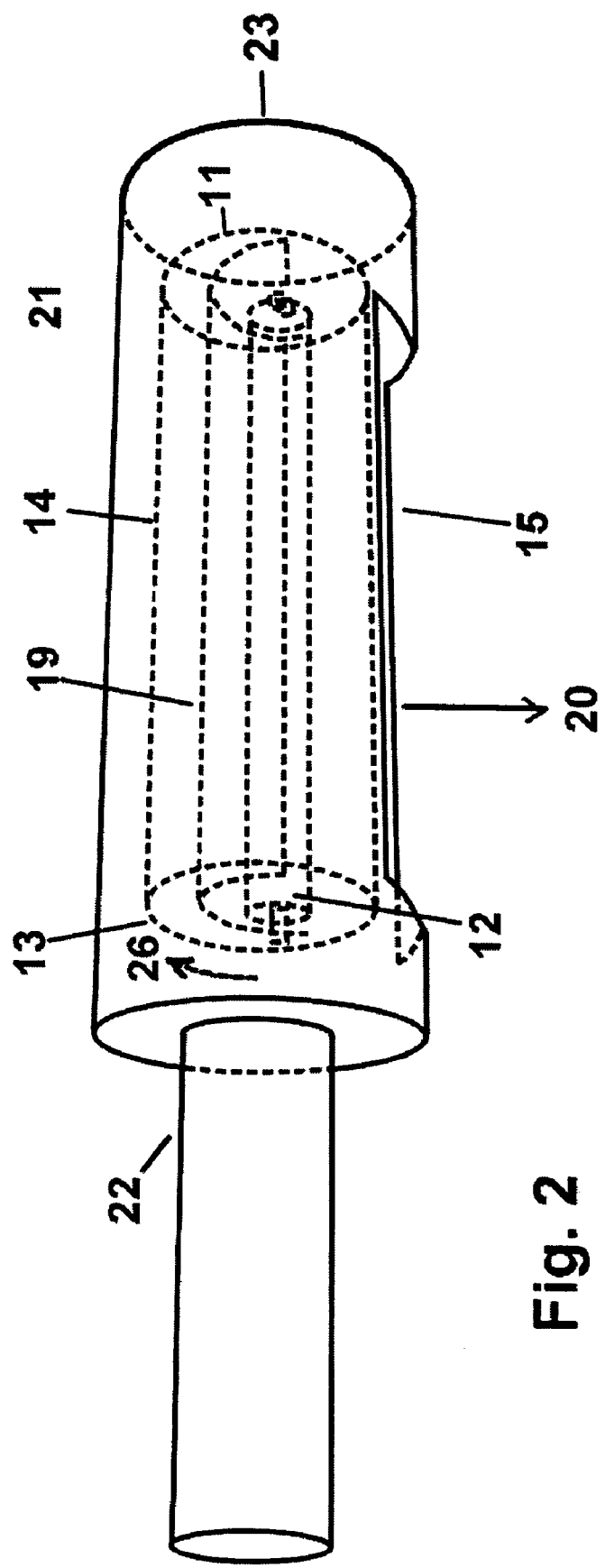
FIG. 2 is a perspective view of the first embodiment of FIG. 1A incorporated in hand held illumination wand according to the present invention.

A specific use for which the embodiment of FIG. 1A is particularly well adapted is in a hand-held mineralogical lamp 21, as shown in FIG. 2. In mineralogy, it is often necessary to carry such lamps afield, in order to study the fluorescence of mineral materials in situ, such as on exposed rock surfaces (preferably at night) or within caverns or mines. In this hand-held variation of the first preferred embodiment, the apparatus 11 (with source 12, cylindrical support 13 with a plurality of wavelength-transforming materials 14, and preferably reflector unit 19 and light exit port 15 as indicated) is constructed in on a smaller scale than might be used in a unit not designed for mobile operation, and is contained within a wand-like shell 23 with a handle 22 designed so that light may be emitted in a preferred direction 20. The smallness and lightness of such a compact unit 21 is desirable in that it is more maneuverable when traversing the often rugged terrain that mineralogists explore, such as the inside of mines, and also is less tiring for the operator to carry for prolonged periods. This would also be advantageous in forensic use where prolonged use in a mobile environment may be required. A smaller size primary light source also simplifies the power supply requirements, in that a smaller assembly can more easily be powered by batteries (particularly of the dry cell type) as opposed to cumbersome and dangerous lead-acid batteries.

Figure 3:
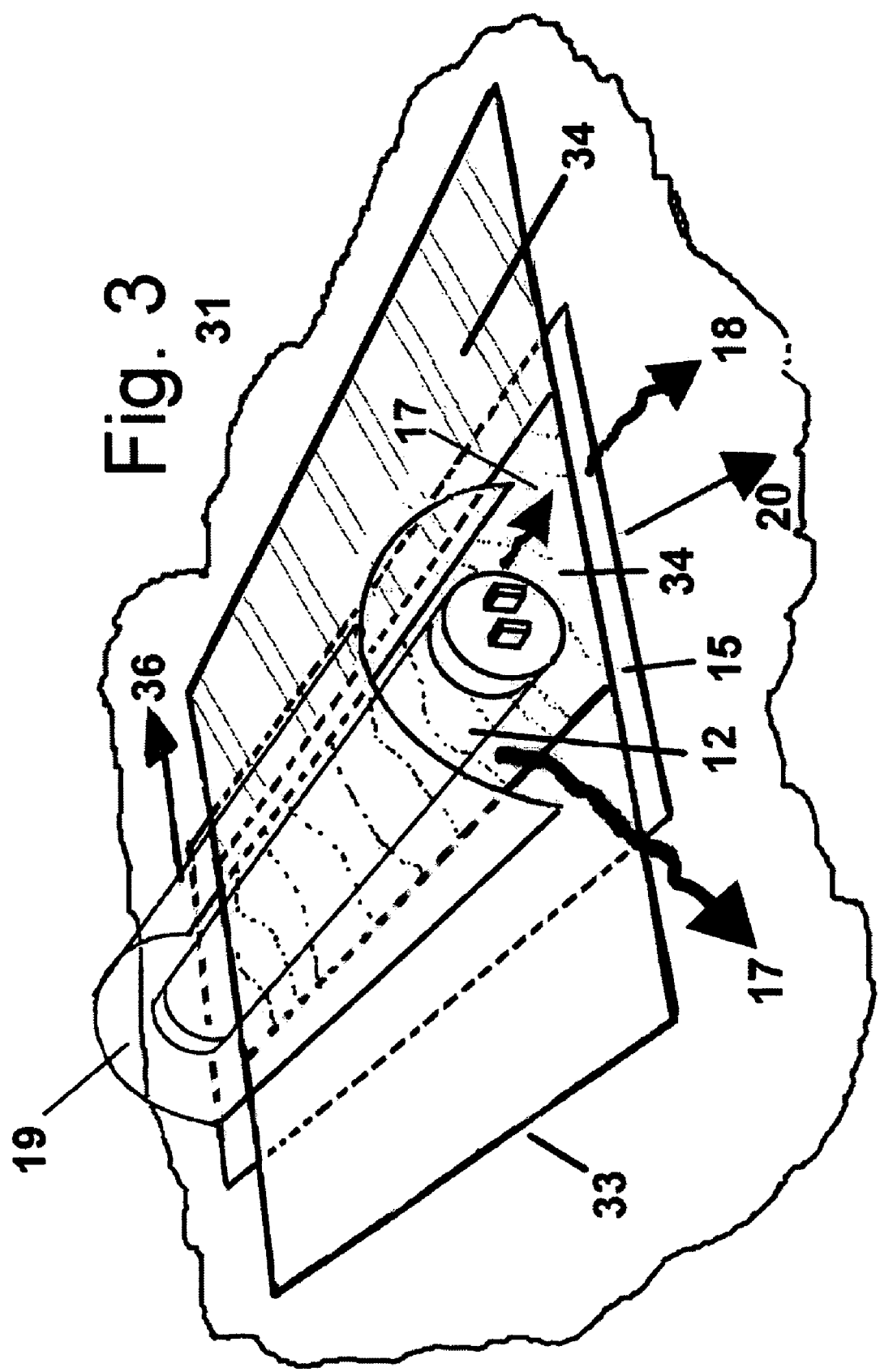
FIG. 3 is a perspective view of a second preferred embodiment of a variable wavelength ultraviolet lamp according to the present invention, wherein a substantially flat substrate is employed for supporting one or more phosphors and selection of one or more phosphors is made by substantially linear movement.

A second preferred embodiment, shown in FIG. 3, comprises wavelength-transforming materials that are disposed on a substantially flat unit that allows selection of the desired wavelength band of emitted light. In the second preferred embodiment 31 shown in FIG. 3, the source of primary light 12 is located behind substrate 33, which is substantially flat. A plurality of wavelength-transforming materials 34 are, in turn, disposed on substrate 33. To select one or more wavelength-transforming materials to emit light in the preferred direction of light emission 20, the substrate 33 is moved in its plane by a sliding movement, illustrated by arrow 36, such that the wavelength-transforming materials selected are positioned in front of the primary light source 12 in the preferred direction of light emission 20. Preferably a reflector unit 19 is placed so as to direct light from the primary light source toward the selected wavelength-transforming material 34 and in the preferred direction of light emission 20, and away from unselected wavelength-transforming materials disposed on substrate 33. Preferably a light exit port 15 comprising walls, baffles, slits, openings or the like serves to direct light in the preferred direction of light emission 20.

Light 17 from the primary light source, either direct or reflected by reflector unit 19, causes wavelength-transformed light 18 emanating from one or more wavelength-transforming materials selected from among the plurality of wavelength-transforming materials 34 to be emitted from the apparatus in the preferred direction of light emission 20. As previously discussed with respect to the embodiment of FIG. 1, the wavelength-transforming materials preferably comprise phosphors that are coated on respective areas of the substrate, each of which may selected in turn by means of a sliding motion, to be placed between the primary light source 12 and in the preferred direction of light emission 20. Also, as previously discussed, two or more wavelength-transforming materials, or a transparent area and one or more wavelength-transforming materials, may be arranged on the substrate such that they can be placed between the primary light source and in the preferred direction of light emission 20 so that more than one wavelength band is simultaneously emitted from the device.

Figure 4:
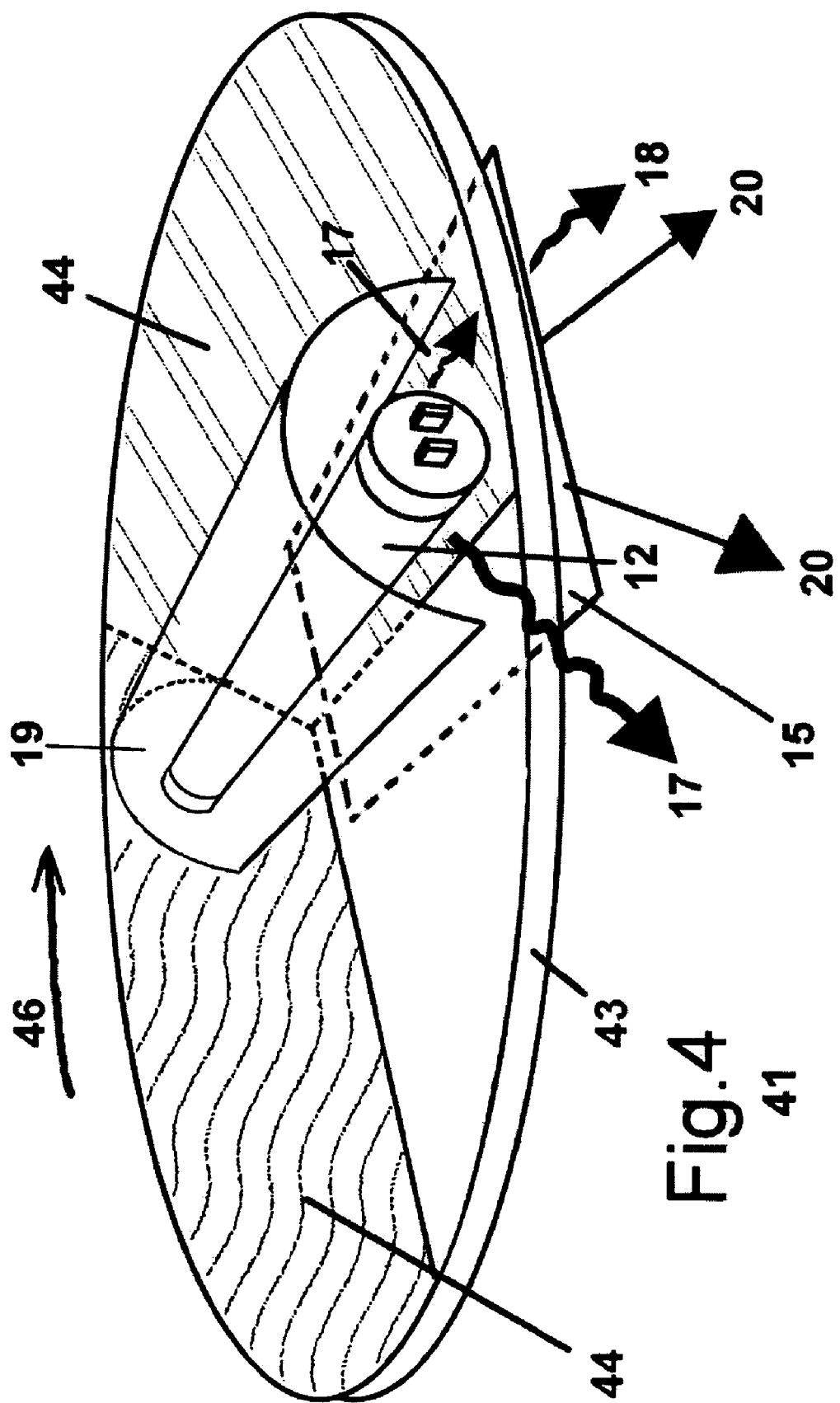
FIG. 4 is a perspective view of a third preferred embodiment of a variable wavelength ultraviolet lamp according to the present invention, wherein a disc-shaped substrate is employed for supporting one or more phosphors and selection is made by a planar rotational movement of the disc.

A third preferred embodiment 41 is shown in FIG. 4. In apparatus 41 the primary light source 12 is located adjacent to substrate 43 which, in this case, is substantially flat and disc shaped and on which are disposed a plurality of wavelength-transforming materials 44 comprising sectors of the disc. Selection of one or more of the wavelength-transforming materials, or a transparent portion, is made by rotating the disc-shaped substrate in its plane, as shown by arrow 46, such that one or more of the wavelength-transforming materials selected from the plurality of wavelength-transforming materials 44 is positioned in front of the primary light source 12 in the preferred direction of light emission 20. Here also, a reflector unit 19 is preferably employed to direct light from primary light source 12 toward the selected wavelength-transforming materials 44 and in the preferred direction of light emission 20 and away from unselected wavelength-transforming materials. Preferably a light exit port 15, comprising walls, baffles, slits, openings or the like, serves to direct light in the preferred direction of light emission 20. As in other embodiments, light 17 from the primary light source 12 may thus either illuminate one or more wavelength-transforming materials 44 such that light of a different distribution of wavelengths 18 is emitted in preferred direction 20, or untransformed light 17 may be emitted unchanged.

The apparatus may be used for illuminating specimens for study under a fluorescence microscope, where small samples are examined under various wavelengths of UV light. Such samples may be mineralogical, chemical or biological in nature. In this embodiment, the apparatus may be adapted for use with a microscope such that the wavelength of illuminating light is selected by the user through placement of one or more of the plurality of wavelength-transforming materials in front of the primary light source 12 in the preferred direction of light emission 20 into the portion of the microscope optics assembly that gathers light for illumination of the object to be observed. A flat substrate, such as substrate 33 or substrate 43, is convenient for placing this selectable light source close to the portion of the microscope optical system that it is intended to illuminate.

An additional preferred embodiment of the present invention involves transilluminators, such as are used in biological research for viewing of electrophoresis gels used for analysis of DNA or other biochemical materials. In this preferred embodiment, shown in FIGS. 5A and 5B, the light emanating from the primary light source 12 excites wavelength-shifted light through illumination of at least one of the plurality of wavelength-transforming materials 54, which then passes in the preferred direction of light emission 20, preferably through an exit port 55 adapted to illuminate articles of the size, shape and properties of the electrophoresis gels.

Figure 5A:
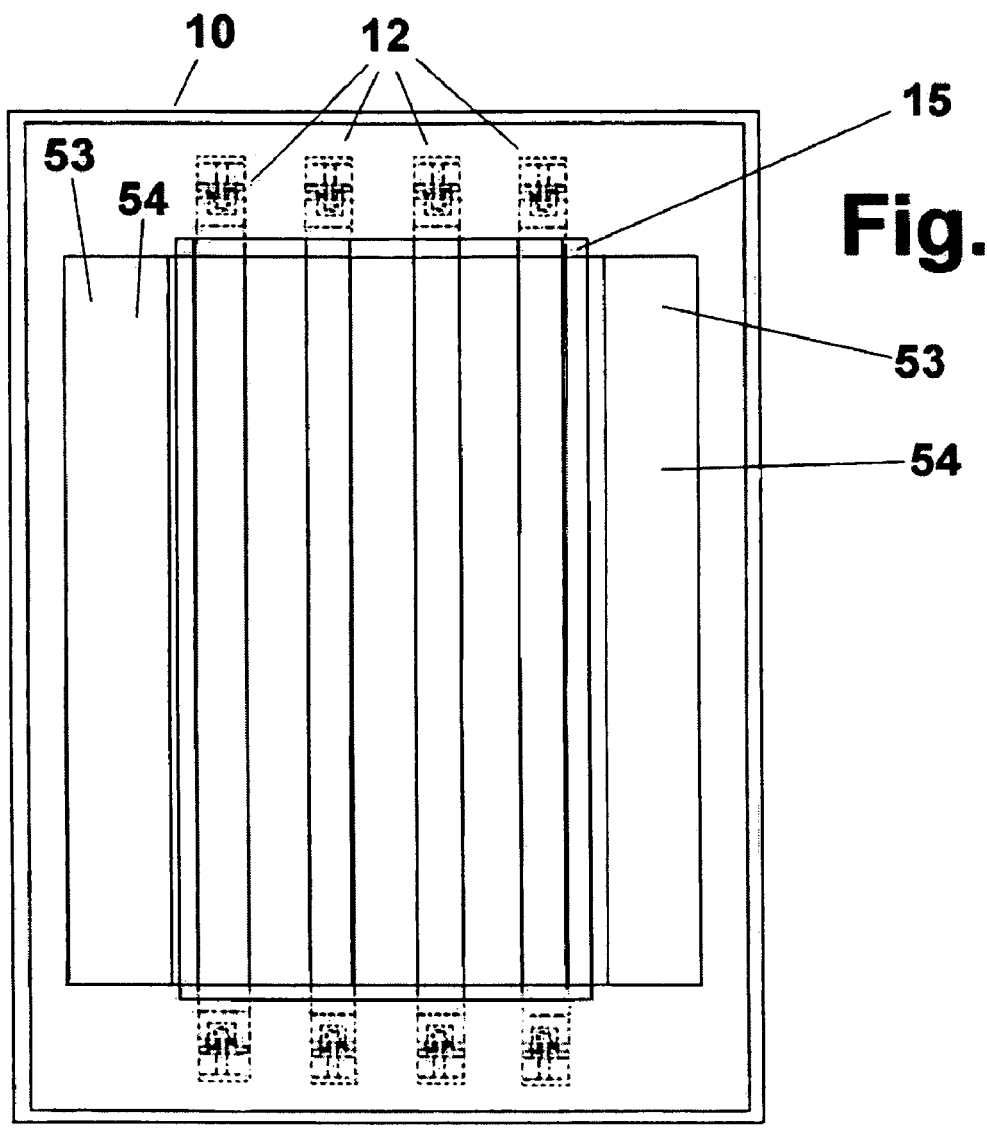
FIG. 5A is a plan view of a fourth preferred embodiment of a variable wavelength ultraviolet lamp according to the present invention, wherein a flexible sheet of transparent substrate is employed for supporting one ore more phosphors and selection is made by movement of the sheet over the source of primary light.
Figure 5B:
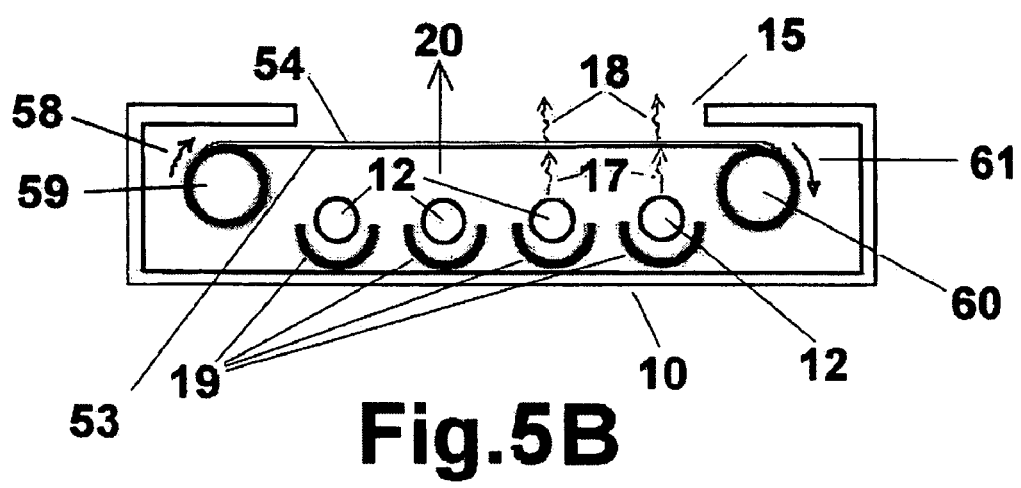
FIG. 5B is a section of the fourth preferred embodiment shown in FIG. 5A.
Figure 6:
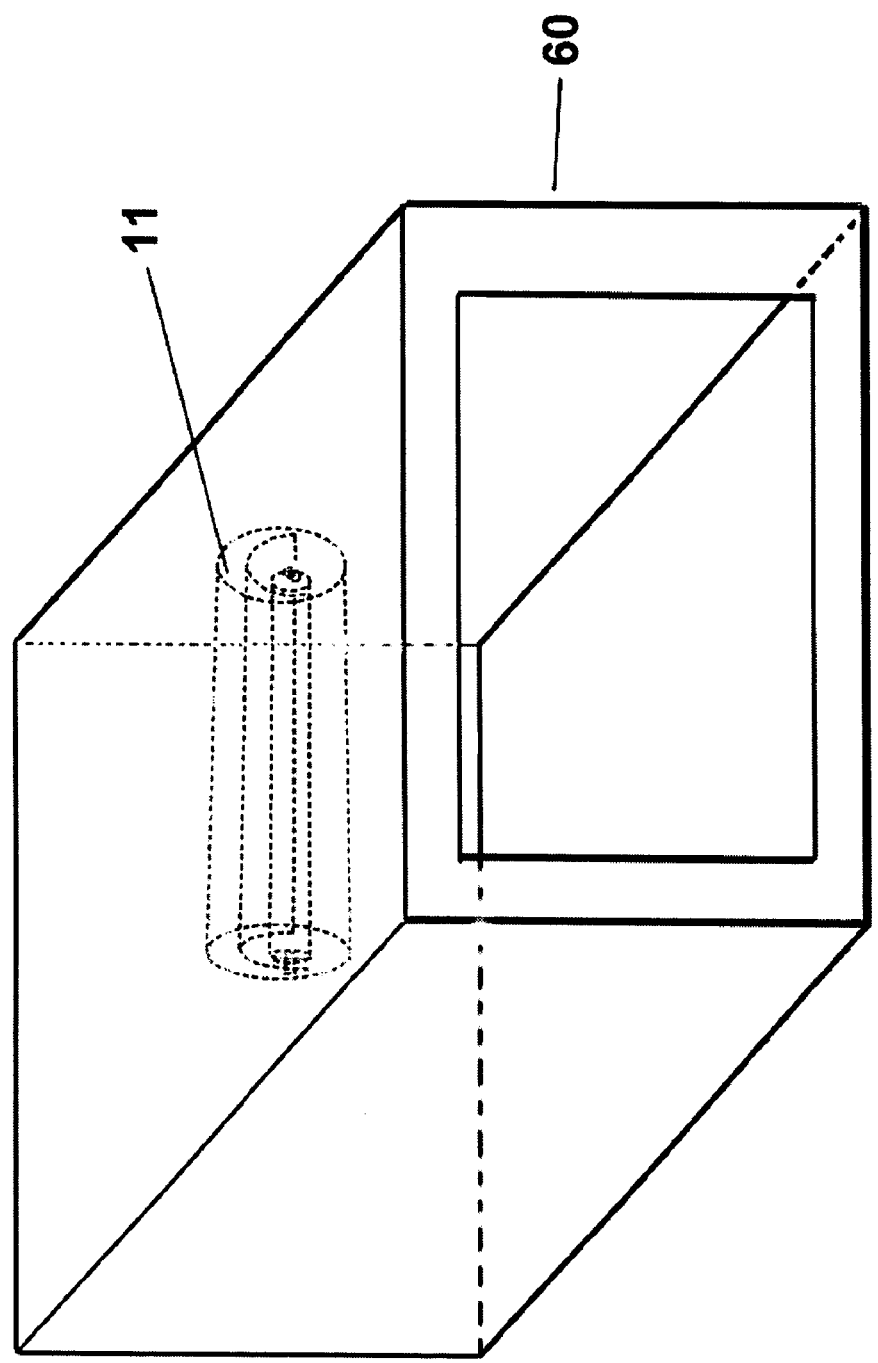
FIG. 6 is a perspective view of a variable wavelength ultraviolet lamp in combination with a display cabinet for minerals or other fluorescent materials according to the present invention.

In FIGS. 5A and 5B the apparatus 51 is shown as comprising one or more primary light sources 12 which are located behind substrate 53, comprising a sheet of flexible material on which various wavelength-transforming materials 54 are disposed, such that light 17 from the primary light source 12 falls upon the selected wavelength-transforming material and that wavelength-transformed light 18 leaves the apparatus in the preferred direction of light emission 20, preferably through light exit port 15. The selection by the user of the desired wavelength-transforming material is accomplished by moving the flexible material sheet 53 from roller 59 to roller 60, as shown by arrows 58 and 61, respectively, such that the desired member is placed between primary light source 12 and in the direction of preferred light emission 20, preferably through light exit port 15 of the transilluminator unit. Due to the relatively large area of such gels that must be illuminated, this embodiment may involve the use of multiple primary light sources 12 located behind a flexible sheet form 53 bearing the plurality of wavelength-transforming materials 54. In this embodiment also, reflector units 19 may preferably be used to direct light from primary light source 12 toward selected wavelength-transforming material 54 and light exit port 15.

Any of these preferred embodiments may be used in the display of fluorescent materials such as minerals, where it is desired to display the fluorescent materials in a case for viewing, as shown in FIG. 6. In such a system it may prove particularly desirable to employ an automated system for selecting among the plurality of wavelength-transforming materials, such that the objects are sequentially seen under, for instance, UV C, then UV B, then UV A, then visible or white light. Apparatus 61 comprises a display cabinet 60 with any embodiment in accordance with the present invention used to illuminate the interior. Preferred embodiment 11 is shown as an example thereof.

As well as displaying fluorescent minerals and rock specimens, any of the above embodiments could be used in a terrarium where fluorescent plants or animals are displayed, for instance plants genetically engineered to express fluorescent proteins such that they would emit light when illuminated with ultraviolet light. Similarly, any of the above embodiments could be used in an aquarium where fluorescent aquatic plants or animals are displayed, for example genetically engineered organisms such as zebra fish that express fluorescent proteins such that they would fluoresce upon exposure to ultraviolet light. As used herein, the term "display cabinet" means any container for displaying fluorescent items, including without limitation a mineral display, a terrarium, and an aquarium.

The wavelength-transforming materials of any of the preferred embodiments may comprise any material or system that absorbs light of one wavelength or band of wavelengths and emits light of another wavelength or band of wavelengths, thus modifying the light's distribution of spectral density. Such materials or systems include phosphors and include also materials or systems such as nano-materials, for instance "quantum dots", whose properties are a combination of bulk properties and physical particle size.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. An apparatus for selectively producing one or more of a plurality of wavelength distributions of light, comprising:
   a primary light source having a primary wavelength distribution;
   at least one wavelength-transforming material that, in response to illumination by said primary light source produces secondary light having a wavelength distribution different from the primary light wavelength distribution;
   a wavelength-transforming material selection mechanism for placing at least one selected portion of said at least one wavelength-transforming materials relative to said primary light source, whereby illumination by said primary light source takes place, such that the selected portion of said at least one wavelength-transforming materials emit from the apparatus a secondary light having a wavelength distribution different from the primary light wavelength distribution;
   wherein said wavelength-transforming material selection mechanism comprises a transparent substrate movably coupled proximate to said primary light source, said transparent substrate having said at least one wavelength transforming material disposed thereon upon less than the total surface area of one side of said transparent substrate thereby leaving at least one completely uncoated transparent section; and
   wherein selectable relative motion of said transparent substrate alternatively places at least a selected portion of said transparent substrate relative to said primary light source in a preferred direction of emission.

2. An apparatus for selectively producing one or more of a plurality of wavelength distributions of light, comprising:
   a primary light source having a primary wavelength distribution;
   at least one wavelength-transforming material that, in response to illumination by said primary light source produces secondary light having a wavelength distribution different from the primary light wavelength distribution, the wavelength-transforming material being disposed on a substrate external to the primary light source;
   a wavelength-transforming material selection mechanism for placing at least a portion of one or more selected wavelength-transforming materials in front of said primary light source, in a selected preferred direction of light emission from the apparatus, such that the selected wavelength-transforming materials emit from the apparatus light having a wavelength distribution different from the primary light wavelength distribution; and
   wherein the wavelength-transforming material selection mechanism comprises a cylinder surrounding the primary light source, one or more wavelength-transforming materials being disposed on a surface of the cylinder such that at least one wavelength-transforming material may be placed in front of the primary light source in a preferred direction of light emission from the apparatus by movement of the cylinder; and
   wherein the movement of the cylinder comprises rotation of the cylinder about its axis of rotation.

3. A method for producing selectable wavelength distributions of light, comprising:
   providing a primary light source having a primary wavelength distribution;
   selectively placing in front of and external to the primary light source in a preferred direction of light emission from the primary light source one or more wavelength-transforming materials for producing light having a wavelength distribution different from the primary light wavelength distribution; and
   wherein said selectively placing comprises rotating around the primary light source a cylindrical support having wavelength-transforming materials disposed thereon such that one or more wavelength-transforming materials are selectively placed in front of the primary light source in a preferred direction of light emission.

* * * * *